UNITED STATES PATENT OFFICE.

LEVI B. DARLING, OF PROVIDENCE, RHODE ISLAND.

IMPROVEMENT IN PROCESSES FOR REFINING JEWELERS' SCRAPS.

Specification forming part of Letters Patent No. 12,585, dated March 27, 1855.

*To all whom it may concern:*

Be it known that I, LEVI B. DARLING, of the city and county of Providence, and State of Rhode Island, have invented a new and useful process for recovering, purifying, and refining the gold and silver contained in the scraps, filings, and imperfect bars of plated stock in jewelers' and silversmiths' shops, &c.; and I do hereby declare that the following is a full, clear, and exact description of the same.

In order to show the difference between my process and that which is ordinarily pursued for the recovery of gold and silver from the scraps, filings, &c., of jewelers' shops, I will first describe the common process, which is very simple, but tedious, troublesome, expensive, and imperfect. That process simply consists in submitting the scraps, filings, &c., named to a very high heat in a crucible, with some flux—such as niter and common salt. The scraps, &c., are placed in a crucible, mixed with the flux and placed in a fire, the heat of which must be raised to an exceedingly high temperature by a blast, so as to reduce the contents of the crucible to a cinder. During this operation the operator must exercise a strict watch and great care, lest the crucible become excoriated by the action of the niter, in which case the precious metal and flux—the contents of the crucible—are lost in the fire, from which it is exceedingly difficult to recover them. If carefully conducted, however, the gold and silver are separated partially by this process from the base metals, and are found in the state of a "button" at the bottom of the crucible. With respect to the reduction of the gold and silver by this process, a portion of them is "held up," as it is termed, in the flux, and the cinder of this flux must be pulverized and remixed with a quantity of new flux equal to its own weight, and resubmitted to a powerful heat in a crucible as long as the crucible will stand, in order to recover them. Even then a portion of the precious metals is held up in the second flux, and the process has to be repeated a number of times to recover all the precious metals. By this process a whole day is usually spent in recovering and refining a few pounds of scraps, &c.

My new process is entirely different from the common one described. It consists in converting the impure or base metals which are combined with the precious metals—gold and silver—in the scraps, &c., into oxides by the use of an oxidizing-salt in contact with the scraps, at a comparatively low heat, then separating the oxides of the base metals by sulphuric acid, after which they—the spongy, noble metals—are washed and reduced to a metallic state by a proper flux and heat in any of the known ways.

To enable others skilled in the art to practice my invention, I will proceed to describe the same clearly without prolixity of language.

I first take of goldsmiths' or jewelers' scraps, filings, and imperfect bars of plate, &c., which generally contain gold, silver, copper, zinc, tin, bismuth, and antimony, such a quantity, by weight, as I desire to operate on. For about fifteen pounds of scraps, &c., I take a common German sand crucible of such a capacity as will contain about two quarts, and I place it in any proper furnace until it is red-hot, when I introduce a small portion of the scrap, &c., stock, and suffer it to melt. I then add a little niter and stir it along with the scraps, &c., in the crucible, so as to mix them quickly. When this is done I add a little more of the scrap stock and the niter, stirring all up, and thus continue adding small portions of the scrap metal stock and the niter until the crucible is nearly full. I then have an iron pot at hand, and with a small iron ladle I transfer the red-hot contents of the crucible to it, (the iron pot,) and keep stirring them up as they are transferred in small quantities, to prevent them from settling in a solid mass as they cool down, but leave them in a porous state. When the whole of the contents of the crucible are transferred to the iron pot fresh quantities of scrap-stock may be treated in the crucible in the same manner. Care must be exercised by the operator that none of the contents of the crucible be transferred to the iron pot to cool that is not oxidized, and if any of the unoxidized scraps, &c., are found at the bottom of the crucible a little more niter is added, and these are stirred until oxidation of the base metals is effected. By this method of treating the scraps in the crucible the oxidation of the base metals is effected very rapidly as soon as they come in contact with the oxygen from the niter at a proper heat, and are left as an earthy powder. When the contents of the iron pot are cooled they are placed in a stoneware vessel of suitable dimensions, when cold water is added and the mass stirred with a spatula, so as to dissolve the parts that are soluble in the water. These are poured off and the insoluble parts retained. Two or more waters are required for this washing operation. When it is completed the insoluble oxides and the remaining contents of the stoneware vessel (the water of washing being poured off) are treated with dilute sulphuric acid—common sulphuric acid, that sold by the druggists—diluted with about twice its bulk of water, which is poured gradually over the substances described in the stoneware vessel. This takes up the black protoxide of copper which is formed by the aforesaid described process, and converts it into the sulphate of copper, and as copper, which is valuable, is the most abundant metal generally contained in the scraps, it is thus obtained in solution, and can be poured off and crystallized. Water and acid are twice applied to the contents of the stoneware vessel, in order to act fully on all the metals that can be converted into sulphates. The gold and silver of the mass are found in a spongy state, after the acid of the solution is poured off, at the bottom of the stoneware vessel. With them there is found the white sulphate of lead, if it has been in the scraps; also, the sulphates of some antimony and bismuth, if these metals have been in the scraps, &c. This may be said to complete my process, the object of which is to reduce the base metals combined with the gold and silver in scraps, &c., of jewelers' shops to the state of oxides and sulphates in a rapid manner, and to separate these noble metals chemically in a spongy state from the base metals, especially the copper. After all the washings and the acidulous solutions have been poured off the gold and silver, in a spongy state found at the bottom of the stoneware vessel, generally contain about one-fiftieth the original stock of the impure or base metals. This small quantity can be quickly and easily removed by heat and fluxing.

By this process I am enabled to refine and purify four times the amount of stock of jewelers' scraps, &c., in the same time required by the common process. Besides, I obtain more gold and silver from the same amount of scrap-stock and obtain them in a purer state—that is, the base metals are more thoroughly separated than by the common process. The expense of my new process is therefore much less than the old. As a practical smelter and refiner, having mostly all the scraps and sweepings of the jewelers in Providence to refine by my new process, I can return a greater amount of pure gold and silver to the jewelers from their scraps, filings, &c., than has ever been done before.

What I claim as my invention, and desire to secure by Letters Patent, is—

The process, as described, of separating and recovering the gold and silver from goldsmiths' and jewelers' scraps—such as turnings, sweepings, cuttings, filings—which contain both noble and base metals—that is, by melting down the metallic compounds, then stirring in gradually the niter and working the mass without fluxing, then washing with water and treating with sulphuric acid to convert the oxidized products into sulphates, in the manner described.

LEVI B. DARLING.

Witnesses:
NATHAN MASON,
ABRAHAM PAYNE.